United States Patent
Jia (10) Patent No.: US 8,065,681 B2
(45) Date of Patent: Nov. 22, 2011

(54) GENERIC SHARED MEMORY BARRIER

(75) Inventor: Bin Jia, West New York, NJ (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 11/871,604

(22) Filed: Oct. 12, 2007

(65) Prior Publication Data

US 2009/0100196 A1 Apr. 16, 2009

(51) Int. Cl.
*G06F 9/46* (2006.01)
*G06F 13/00* (2006.01)
*G06F 15/76* (2006.01)
*G06F 15/173* (2006.01)

(52) U.S. Cl. ............ 718/102; 711/154; 712/14; 709/226

(58) Field of Classification Search .................. 709/226; 718/102; 712/19; 711/154
See application file for complete search history.

(56) References Cited

U.S. PATENT DOCUMENTS

| | | | | |
|---|---|---|---|---|
| 5,050,070 A | * | 9/1991 | Chastain et al. | 712/203 |
| 5,361,370 A | * | 11/1994 | Sprague et al. | 712/22 |
| 5,434,995 A | * | 7/1995 | Oberlin et al. | 713/375 |
| 5,448,732 A | * | 9/1995 | Matsumoto | 718/104 |
| 5,696,922 A | * | 12/1997 | Fromm | 711/5 |
| 5,765,181 A | * | 6/1998 | Oberlin et al. | 711/5 |
| 5,867,723 A | * | 2/1999 | Chin et al. | 712/11 |
| 5,978,839 A | * | 11/1999 | Okuhara et al. | 709/215 |
| 6,119,198 A | * | 9/2000 | Fromm | 711/5 |
| 6,170,003 B1 | * | 1/2001 | Benkual et al. | 709/214 |
| 6,308,316 B1 | * | 10/2001 | Hashimoto et al. | 717/127 |
| 6,330,604 B1 | * | 12/2001 | Higuchi et al. | 709/226 |
| 6,502,136 B1 | * | 12/2002 | Higuchi et al. | 709/226 |
| 6,986,022 B1 | * | 1/2006 | Marshall et al. | 712/19 |
| 7,100,021 B1 | * | 8/2006 | Marshall et al. | 712/19 |
| 7,191,294 B2 | * | 3/2007 | Nakamura et al. | 711/147 |
| 7,487,501 B2 | * | 2/2009 | Silvera et al. | 718/100 |
| 7,581,222 B2 | * | 8/2009 | Blainey et al. | 718/102 |
| 2002/0091786 A1 | * | 7/2002 | Yamaguchi et al. | 709/213 |
| 2003/0154284 A1 | * | 8/2003 | Bernardin et al. | 709/226 |
| 2004/0187118 A1 | * | 9/2004 | Blainey et al. | 718/100 |
| 2005/0050374 A1 | * | 3/2005 | Nakamura et al. | 713/375 |
| 2006/0048147 A1 | * | 3/2006 | Silvera et al. | 718/100 |
| 2006/0242308 A1 | * | 10/2006 | Carter et al. | 709/229 |
| 2007/0124539 A1 | * | 5/2007 | Mandler | 711/128 |
| 2007/0143549 A1 | * | 6/2007 | Saha et al. | 711/145 |
| 2007/0198785 A1 | * | 8/2007 | Kogge et al. | 711/154 |

* cited by examiner

*Primary Examiner* — Firmin Backer
*Assistant Examiner* — Michael A Chambers
(74) *Attorney, Agent, or Firm* — Jon A. Gibbons; Fleit Gibbons Gutman Bongini & Bianco PL (57) ABSTRACT

A method, information processing node, and a computer program storage product are provided for performing synchronization operations between participants of a program. Each participant includes at least one of a set of processes and a set of threads. Each participant in a first subset of participants of a program updates a portion of a first local vector that is local to the respective participant. Each participant in a second subset of participants of the program updates a portion of a second local vector that is local to the respective participant. The participants in the second subset exit the synchronization barrier in response to determining that all of the participants in the first subset have reached the synchronization barrier.

20 Claims, 7 Drawing Sheets

| | participants 0 ... A-1 | participants A ... B-1 | participants B ... N-1 |
|---|---|---|---|
| $T_0$ | call barrier(N, A) | call barrier(N, B) | call barrier(N, N) |
| $T_1$ | first A participants exit and perform computation and/or inter-node communication. | block in barrier | block in barrier |
| $T_2$ | call barrier(A, B) | | |
| $T_3$ | first B participants exit and perform computation and/or inter-node communication. | | |
| $T_4$ | call barrier(B, N) | | |
| $T_5$ | all N participants exit the barrier | | |

FIG. 6

| | participants 0 ... A-1 | participants A ... B-1 | participants B ... N-1 |
|---|---|---|---|
| $T_0$ | call barrier(N, A) | call barrier(B, N) | call barrier(N, N) |
| $T_1$ | First B participants exit and perform computation and/or inter-node communication. | | block in barrier |
| $T_2$ | call barrier(B, A) | call barrier(B, N) | |
| $T_3$ | First A participants exit and perform computation and/or inter-node communication. | block in barrier | |
| $T_4$ | call barrier(A, N) | | |
| $T_5$ | all N participants exit the barrier | | |

GENERIC SHARED MEMORY BARRIER

STATEMENT REGARDING FEDERALLY SPONSORED RESEARCH OR DEVELOPMENT

This invention was made with Government support under Agreement No. HR0011-07-9-0002 awarded by DARPA. The Government has certain rights in the invention.

FIELD OF THE INVENTION

The present invention generally relates to the field of process/thread synchronization in processing environments, and more particularly relates to synchronizing processes/threads utilizing barrier operations in multi-tasking and parallel processing environments.

BACKGROUND OF THE INVENTION

Parallel computing allows a computational problem to be decomposed into multiple tasks. These multiple tasks are then carried out by a plurality of processes or threads which may operate concurrently. Parallel computing may allow a computational problem to be solved in a shorter amount of time by utilizing the computational resources of a plurality of processors. Parallel computing may also allow large computational problems to be solved that may not be practical to solve using conventional computing systems and methods. With currently available parallel computing systems, it is possible to harness the computational resources of hundreds or thousands of computer processors to run hundreds or thousands of concurrent processes.

Typically, there are interdependencies between at least some of the concurrent processes. In order to avoid a condition where one process races too far ahead of another interdependent process (which may cause an indeterminate computational result), it is often necessary to incorporate a process synchronization mechanism, such as a barrier synchronization point. A barrier synchronization point is one of the most widely used synchronization operations in parallel applications. In the most common format of barrier, each participant, which can be either a process, thread, or a task (a set of processes or tasks), makes a barrier call to register that it reached a particular point of the program it is associated with. The participant then blocks in the barrier call until all participants make the call. In other words, none of the participants can pass the barrier if any of participants have not called the barrier.

One problem with many barrier synchronization methods is that they require a completer barrier even if a partial barrier is sufficient. A complete barrier requires that each and every participant check into the barrier to complete the synchronization and every participant leave the barrier afterwards, while a partial barrier does not require this. In a partial barrier, the synchronization is among a subset of participants and another subset of participants exits the barrier in response to the synchronization among the first subset. The first subset and the second subset have at least one participant in common. One such scenario is a hierarchical synchronization among participants running on multiple nodes and multiple participants running on at least one of the nodes. In this hierarchical synchronization, participants running on the same node first synchronize among themselves, often through shared memory. Then some of the participants are designated to be representatives of all participants on the node to participate in inter-nodal synchronization.

These representatives need to synchronize among themselves once a while if more than one is desired for better inter-nodal performance. Once the inter-nodal synchronization is complete, the representatives need to notify non-representatives the complete of the entire synchronization among all participants. All the synchronization among subsets of participants can be done using complete barrier. One problem with this barrier synchronization method and other methods that use complete barriers for partial barriers is that the cost of a complete barrier is higher than a partial barrier. These methods are inefficient and have high shared memory barrier costs which reduce the benefit of using multiple representatives per node.

Therefore a need exists to overcome the problems with the prior art as discussed above.

SUMMARY OF THE INVENTION

Briefly, in accordance with the present invention, disclosed are a method, information processing node, and computer readable medium for performing synchronization operations between participants of a program. Each participant includes at least one of a set of processes and a set of threads. Each participant also includes a first local vector and a second local vector that are local to the respective participant. The method comprises updating, by each participant in a first subset of participants of a program, a portion of a first local vector that is local to the respective each participant of the first subset. Each participant in a second subset of participants of the program update a portion of a second local vector that is local to the respective each participant of the second subset. The participants in the second of subset participants determine that all of the participants in the first subset of participants have reached the synchronization barrier. The participants in the second subset of participants exit the synchronization barrier in response to the determining that all of the participants in the first subset of participants have reached the synchronization barrier.

In another embodiment, an information processing system for performing synchronization operations between participants of a program is disclosed. Each participant includes at least one of a set of processes and a set of threads. Each participant also includes a first local vector and a second local vector that are local to the respective participant. The information processing system comprises a memory and a processor that is communicatively coupled to the memory. The information processing system also includes a plurality of participants comprising at least first subset of participants and at least a second subset of participants associated with a program. Each participant comprises at least one of a set of processes and a set of threads. Each participant in a first subset of participants of a program is adapted to update a portion of a first local vector that is local to the respective each participant of the first subset. Each participant in a second subset of participants of the program is adapted to update a portion of a second local vector that is local to the respective each participant of the second subset. The participants in the second of subset participants are further adapted to determine that all of the participants in the first subset of participants have reached the synchronization barrier. The participants in the second subset of participants are further adapted to exit the synchronization barrier in response to the determining that all of the participants in the first subset of participants have reached the synchronization barrier.

In yet another embodiment, a computer program storage product for performing synchronization operations between participants of a program is disclosed. Each participant includes at least one of a set of processes and a set of threads. Each participant also includes a first local vector and a second local vector that are local to the respective participant. The computer program storage product comprises instructions for updating, by each participant in a first subset of participants of a program, a portion of a first local vector that is local to the respective each participant of the first subset. Each participant in a second subset of participants of the program update a portion of a second local vector that is local to the respective each participant of the second subset. The participants in the second of subset participants determine that all of the participants in the first subset of participants have reached the synchronization barrier. The participants in the second subset of participants exit the synchronization barrier in response to the determining that all of the participants in the first subset of participants have reached the synchronization barrier.

One advantage of the present invention is that synchronizations can be done through the same set of shared memory resources and do not interfere with the non representatives waiting in the barrier. Various embodiments of the present invention present a generic form of shared memory barrier implementation that supports the following sequence of events. N participants check in the barrier; X of the N participants leave the barrier once all N participants arrive. The remaining participants block in the barrier. The X participants later check back into the barrier. Y of the N participants then leave the barrier after all X participants arrive. The Y participants check back in the barrier again and all N participants exit the barrier. It should be noted that more groups can be defined and the present invention is not limited to only two groups leaving/returning to the barrier before all participants leave the barrier. This provides a more efficient method for performing synchronization barriers with support for partial barriers as well.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and similar terms as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Parallel Processing Environment

Figure 1:
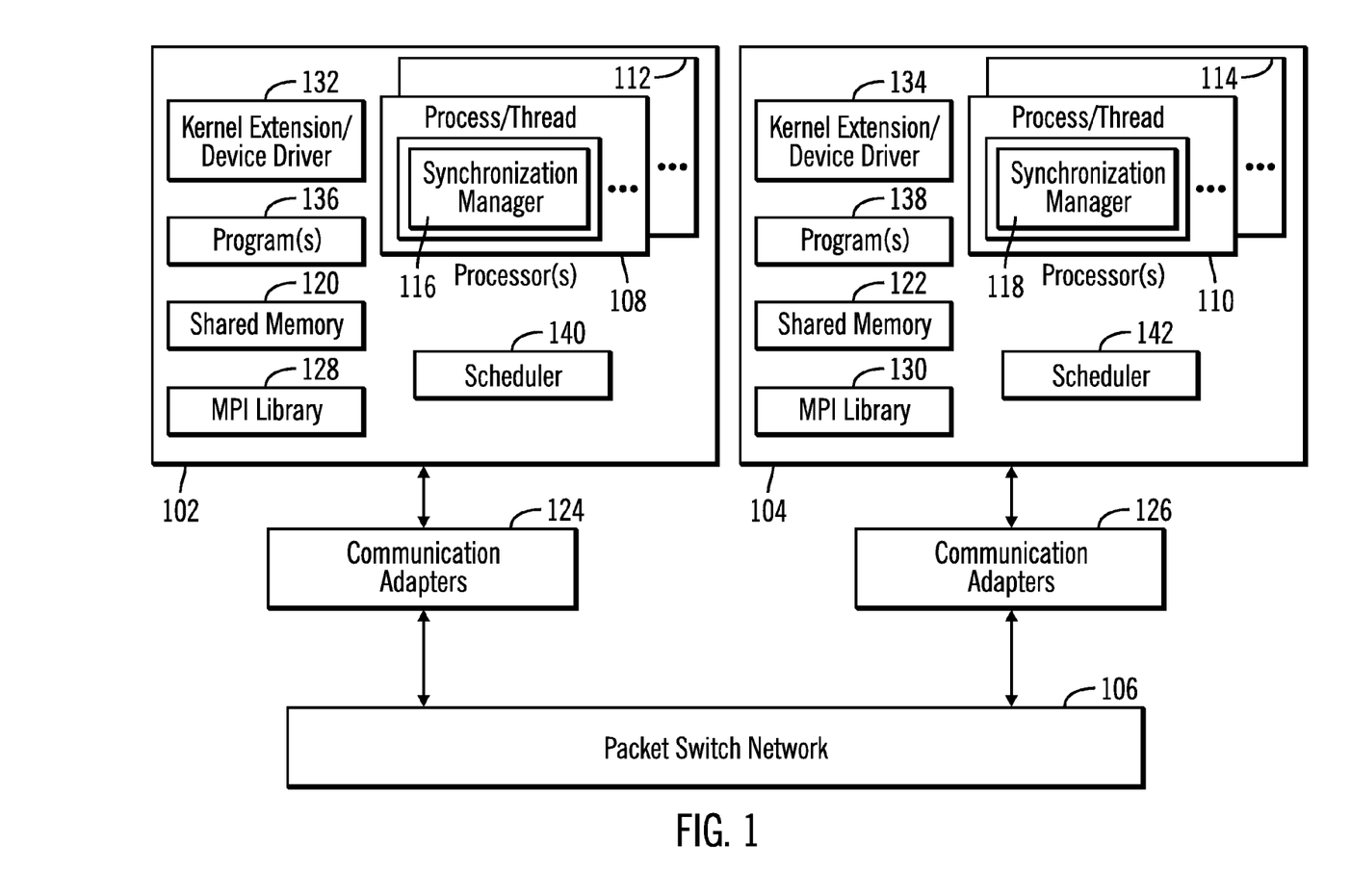
FIG. 1 is a block diagram illustrating a parallel processing system according to one embodiment of the present invention.

According to one embodiment of the present invention, one example of a parallel processing environment 100 is shown in FIG. 1. It should be noted that this configuration is intended to be illustrative and does not limit the present invention in any way in terms of a parallel processing environment that may embody the present invention. In one embodiment, the parallel processing environment 100 can operate in a Symmetric Multi-processing ("SMP") cluster environment. FIG. 1 shows a plurality of information processing systems or processing nodes 102, 104. The processing nodes 102, 104, in one embodiment, are coupled together by a connection 106 which may be a packet switched network such as an SP switch of High Performance Switch ("HPS").

In one embodiment, each processing node 102, 104 comprises a plurality of processors 108, 110 running multiple processes/threads 112, 114. The processes or threads 112, 114 can be associated with, for example, one or more applications/programs 136, 138. It should be noted that the terms "process" and "thread" are used interchangeably throughout this discussion. These processors 108, 110 are coupled to one another via low latency, high bandwidth connections and managed by an operating system, such as AIX, LINUX, or the like. The multi-processing is enabled, in one example, by using multiple processing threads, each thread executing on a processor. Further, in one embodiment, one or more of the processors 108, 110 may provide multi-threading itself. That is, one or more of the processors 108, 110 may be capable of executing, in this example, two threads. In other examples, one or more of the processors can execute any number of threads.

Each process or thread 112, 114, in one embodiment, includes a synchronization manager 116, 118 for performing synchronization operations with other processes or threads, respectively. It should be noted that the synchronization manager 116, 118 only as one non-limiting example. A scheduler 140, 142 communicates with the synchronization manager 116, 118 of each process/thread 112 for instructing each process/thread 112 when to perform a barrier operation. The functions of the synchronization manager 116, 118 and the synchronization operations are discussed in greater detail below. Within the processing environment 100, message packets or messages are transferred intra-nodal (i.e., within SMP nodes) employing shared memory 120, 122. One or more processes 112, 114 of the SMP 102, 104 node can store a message to the shared memory 120, 122, which may then be accessed by one or more other processes of the SMP node 102, 104. Messages are transferred inter-nodal (i.e., between SMP nodes) employing communications adapters 124, 126 coupled to packet switch network 106. Communication between an SMP node 102, 104 and its corresponding communications adapters 124, 126 includes functions for sending and receiving packets. In one embodiment, the interface comprises a Message Passing Interface ("MPI"), also referred to herein as an MPI library 128, 130.

Access to the adapters 124, 126 is mediated by a kernel/extension device driver 132, 134 within each SMP node 102, 104. Extension 132, 134 includes a set of functions that have the authority of the operating system itself (e.g., the AIX operating system or the like). The kernel/extension 132, 134 authorizes use of one or more adapters 124, 126 by a process or thread 112, 114 and has the capability of interrupting the process or thread 112, 114, if desired. Processes or threads 112, 114 communicate with an adapter 124, 126 through the MPI library 128, 130. The MPI library 128, 130 is discussed in greater detail in, for example, an International Business Machines Corporation publication entitled "IBM Parallel Environment for AIX 5L: MPI Subroutine Reference", Version 4, Release 2, Modification 1 (August, 2005), the entirety of which is hereby incorporated herein by reference.

It should be noted that as used herein a "parallel job" is a set of processes or tasks executing on a collection of processors. The processes cooperate and exchange data in order to solve a problem jointly. A "task" or "process" is an instance of an executing program (sequence of instructions), including an address space in one or more flows of control. An "address space" is the set of memory locations that a process may reference or access.

Figure 2:
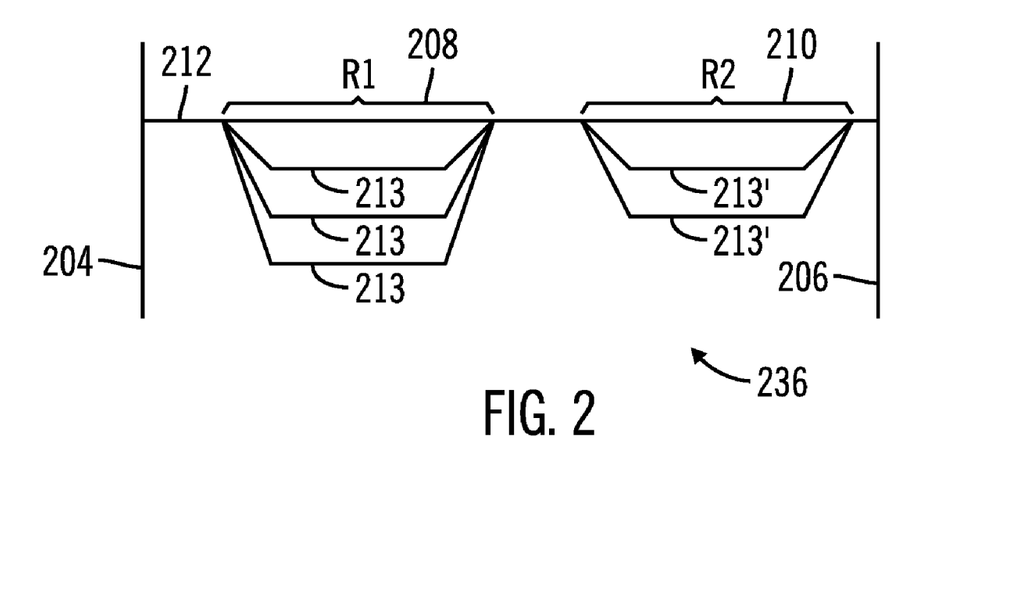
FIG. 2 is a schematic diagram of a number of concurrent processes running in the parallel processing system of FIG. 1 according to one embodiment of the present invention.

FIG. 2 schematically illustrates an example of a software program 236 which may execute within the parallel computing system 100 of FIG. 1. The software program 236 may have a defined master thread or process 212 that runs from the beginning 204 of execution of the software program 236 to its end 206. For example, the master thread or process 212 may execute on a processor 108, 110 in one of the processing nodes 102, 104 of FIG. 1. The software program 236 (which may be initially executed by the master thread or process 212) may also spawn one or more concurrent threads or processes 213, 213' (collectively 213) that may run in parallel with the master thread or process 212 for a portion of the program 236. These concurrent processes 213 may run concurrently on one or more of the processors 108, 110 of FIG. 1. In one embodiment, the software program 236 may assign which processors 108, 110 execute which of the concurrent processes 213 and how the accesses are configured to allow the processors 108, 110 to have access to necessary data and resources within the parallel processing environment 100.

The number of concurrent processes 213 spawned by the software program 236 may change over the course of execution of the software program 236. One instance of concurrent processes 213 spawned by the software program 236 may be referred to as a parallel region. In the example shown in FIG. 2, there are two parallel regions R1 208, R2 210 formed during execution of the software program 236. The first parallel region R1 208 may have associated with it a certain set or subset of processors 108, 110 and logical shared memory 120, 122 required to run the concurrent processes 213 within the region R1 208. Similarly, second parallel region R2 210 may have associated with it another set or subset of processors 108, 110 and logical shared memory 120, 122 required to run the concurrent processes 213' within the region R2 210.

Figure 3:
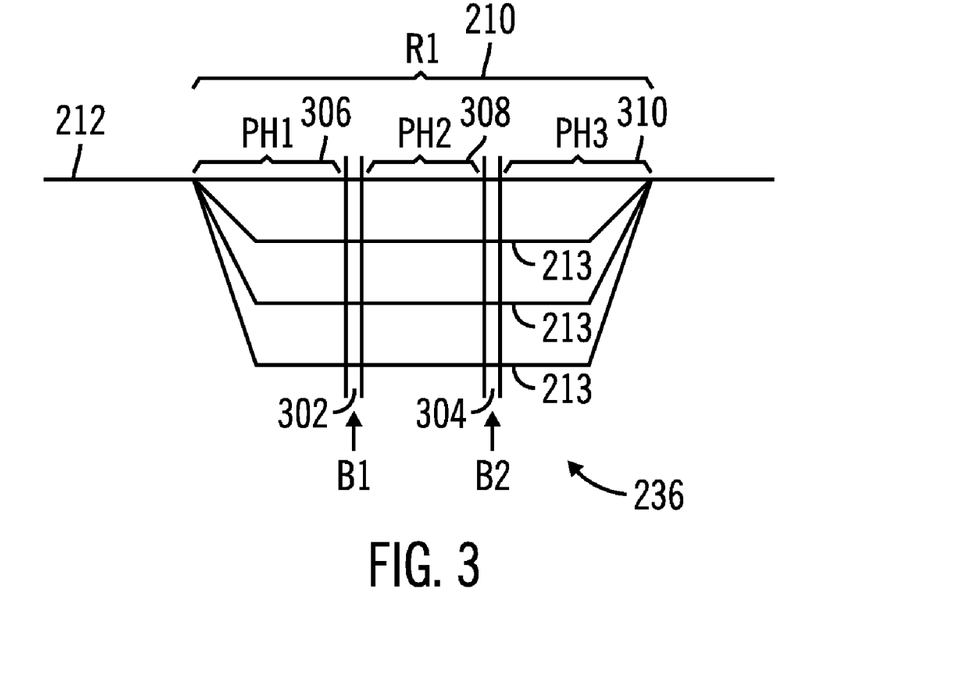
FIG. 3 is a more detailed view of a parallel region of FIG. 2 according to one embodiment of the present invention.

With respect to FIG. 3, within the first parallel region R1 208 (or analogously within the second parallel region R2 210), there may be a number of barriers B1 302, B2 304 which separate phases PH1 306, PH2 308, PH3 310 of the software program 236 within that parallel region R1 210. One phase PH1 306 may include, for example, a software loop after which interdependencies between one or more of the processes 202, 208 require that synchronization occur at barrier B1 302. Upon synchronization at barrier B1 302, the processes 212, 213 may proceed to a second phase PH 308. Similar interdependencies between the processes 212, 213 may then require synchronization at a second barrier B2 304, followed by execution of a third phase PH3 310.

Synchronization Using A Generic Shared Memory Barrier

As discussed above, barrier synchronization points are used to avoid a condition where one process races too far ahead of another interdependent process. OpenMP, which is the standard for shared memory programming model, defines barrier directive to synchronize threads, while the de facto standard of message passing programming model, MPI, defines MPI_BARRIER interface for process synchronization. With respect to threads, the shared memory is shared address space. With respect to processes, the shared memory is the same region of memory mapped to different address spaces.

In a shared memory system such as a processing node 102 discussed above with respect to FIG. 1, it is more efficient for the parallel processes, threads, or tasks, herein referred to as "participants", to communicate through the available shared memory. It should be noted that shared memory is only used as one example of a participant communication mechanism. Other communication mechanisms are also applicable to the various embodiments of the present invention. In conventional shared memory barrier implementations, there is usually one shared memory flag associated with each participant. Participants set and check the values of those shared memory flags to synchronize with each other. When a small to medium number of participants exists, one participant is usually selected as a leader. A leader participant can be a leader of a first subset of participants to leave the barrier, the subset that remains in the barrier, or both. The leader waits for all other participants setting their shared memory flags to check in (e.g., to notify an arrival status in the barrier). The leader then sets its own flag to declare that every participant can leave the barrier (e.g., to notify an exiting status in the barrier). The other participants read the leader's shared memory flag after setting their own flags, and move on (e.g., exit the barrier) when the leader's flag is set to an appropriate value. The values that each participant sets and waits on are the same in one barrier, but must be different between two consecutive barriers. These values are typically predefined in the system.

With respect to SMP clusters, conventional barrier operations are usually performed using a hierarchical approach. Within each processing node where shared memory is available, the participants synchronize through shared memory flags. On each processing node, one participant is selected as a representative of participants on the node. Message passing through network adaptors among representatives is performed for the inter-node part of synchronization. When there is sufficient interconnect resources, having multiple representatives per node participating in inter-node communication can make the inter-node synchronization faster, hence a faster barrier overall.

For example, suppose the participants of the synchronization run on M nodes with N participants running on each. With one representative per node, the barrier can be implemented by the following (let the leader of the on-node shared memory barrier be the representative). During phase 1, N participants check in the on-node shared memory barrier (e.g., arrive in the barrier). During phase 2, once all N participants have arrived, the leader participates in an inter-node barrier among the M leaders. The leader loops on $\log_2(M)$ inter-node communication steps, each time sending one message and receiving another. During phase 3, upon returning from the inter-node barrier, the leader releases other participants on the node by setting its own shared memory flag.

If "n" representatives per node are used in the inter-node barrier, "n" representatives are each sending and receiving messages in every step of phase 2 above. The number of steps reduces to $\log_{n+1}(M)$. However, the "n" representatives need to synchronize among themselves between the steps. For this approach to perform better than using one representative per node, the additional on-node synchronizations among the "n" representatives need to be efficient. This is one example where a partial barrier is desired. Current barrier synchronization methods do not provide this efficiency.

One advantage of the various embodiments of the present invention is that these synchronizations can be done through the same set of shared memory resources and do not interfere with the non representatives waiting in the barrier. Various embodiments of the present invention present a generic form of shared memory barrier implementation that supports the following sequence of events. N participants check in the barrier; X of the N participants leave the barrier once all N participants arrive. The remaining participants block in the barrier. The X participants later check back into the barrier. Y of the N participants then leave the barrier after all X participants arrive. The Y participants check back in the barrier again and all N participants exit the barrier. It should be noted that more groups can be defined and the present invention is not limited to only two groups leaving/returning to the barrier before all participants leave the barrier.

Both X and Y can be smaller or equal to N, and X may be different from Y. When X (or Y) is equal to N, the synchronization can be referred to as a complete shared memory barrier. If X (or Y) is smaller then N, the barrier can be referred to as a partial shared memory barrier. Since the shared memory flag 406 of the leader is monitored by all other participants, embodiments of the present invention provide support for a partial shared memory barrier. For example, different flag values are used for registering the arrival of participants in a barrier and notifying the participants to exit the barrier (as discussed above with respect to FIG. 4). The flag values also encode the information about how many participants are to arrive at the partial barrier before the partial barrier is complete and how many participants can exit the partial barrier.

In one embodiment of the present invention participants are indistinguishable in terms of doing the inter-node communication, i.e. it is sufficient that the partial barriers always occur on the set of participants with the lowest ranks on the node for them to perform the inter-node communication. In the following discussion, N participants such as tasks on each node are ranked from 0 to N-1 in the following discussion. Ranking of a participant can be an automated process or can be manually performed by an administrator. For example, ranking is provided by a resource manager or process scheduler 140 of the parallel process or task. Participant ranking is part of the parallel processing environment and it performed outside of the parallel process or task. A Process scheduler 140 has various ways of assigning a rank to a process or task. In one example, the ranks are assigned according to the order in which the processes are spawned. Usually, the process scheduler 140 places the ranking info into the environment of the running process. When a process or a task is initialized it determines its ranking in the parallel job from the environment. The ranking remains unchanged until the completion of the job.

Figure 4:
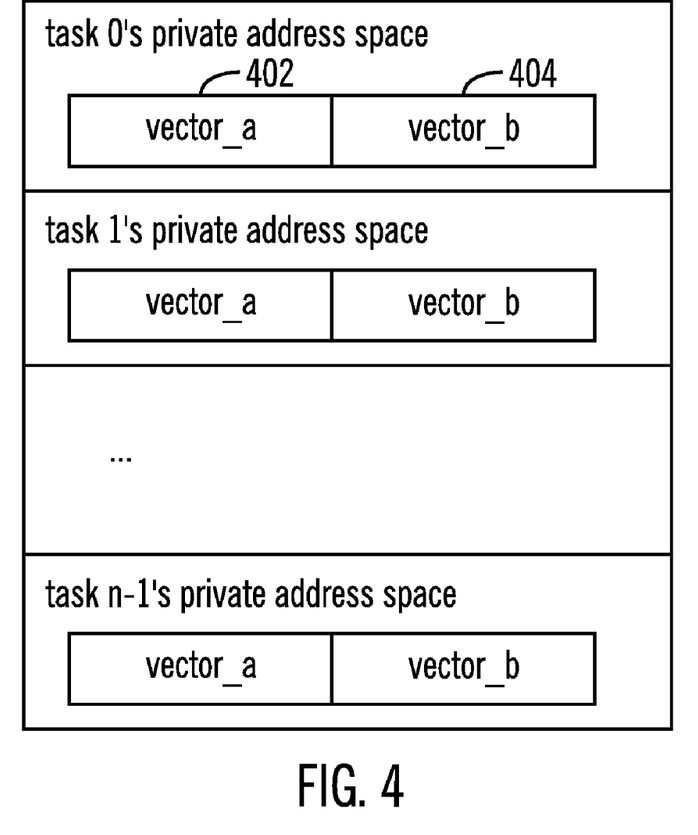
FIG. 4 is a block diagram illustrating private address spaces of program participants according to one embodiment of the present invention.

As discussed above, each participant comprises a synchronization manager 116. The synchronization manager 116 of each participant maintains two local bit vectors 402, 404: one (vector_a) 402 for registering its barrier arrivals, and the other (vector_b) 404 for detecting when the participant is to leave a barrier. In one embodiment, the two vectors 402, 404 are both initialized to include all zero indicators such as values, bits, or the like. Each participant is also associated with one or more shared memory flags 406. The array of shared memory flags, denoted by shm_bar_flags in one embodiment, is also initialized to 0.

In one embodiment, bit 'j' of participant i's shared memory flag 406 is denoted by shm_bar_flags[i][j]. Each call to the barrier specifies two values: p_in, which indicates how many participants the synchronization is performed among, and p_out, which indicates how many participants are to leave the barrier after this synchronization round. The interface can be described as barrier(p_in, p_out). In one embodiment, p_in is greater than the rank of the calling participant on the node, otherwise the calling participant is not part of the synchronization. Also, p_out is greater than the rank of the calling participant, otherwise it is not clear when the calling participant can exit the barrier.

Figure 5:
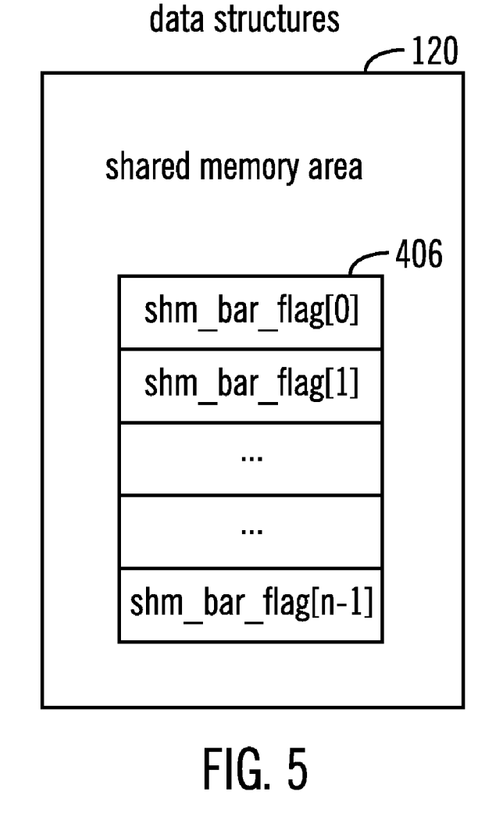
FIG. 5 is a block diagram illustrating a shared memory area for a plurality of program participants according to one embodiment of the present invention.

FIG. 4 shows a block diagram illustrating each participants private address space and FIG. 5 is a block diagram illustrating each shared memory flag associated with each participant in the shared memory area 120. As discussed above, each participant the synchronization manager 116 maintains at least two vectors, vector_a 402 and vector_b 404. These vectors 402, 404 are kept locally by each participant. In other words, only the participant can see its vectors. When a non-leader task arrives at a barrier it updates one of its local vectors 402, 404 and uses this value to set its shared memory flag 406 in the shared memory area 120.

The updated shared memory flag 406 indicates to the leader participant that the non-leader participant has arrived at the barrier. The non-leader participant checks the updated value of the local vector against the leader's shared memory flag to determine if it can exit the barrier. For example, once all of the non-leader participants in a particular subgroup have all arrived at the barrier, the leader participant updates one of its local vectors 402, 404 and the corresponding shared memory flag 406. This indicates to the non-leader participant that its other subgroup members have arrived at the barrier and so it can exit the barrier. The shared memory flag 406 in the shared memory area 120 can be viewed by each participant in the barrier, while the local vectors 402, 404 can only be viewed by the respective participant.

In one embodiment, a program that is associated with the participants determines when a barrier is to occur. In other words, barrier synchronization points exist throughout the program. For example, a call to MPI_Barrier in the program is a synchronization point. When a participant reaches a barrier point, the participant calls the following barrier operation:

```
barrier(p_in, p_out)
{
   vector_a[p_in - 1] = !vector_a[p_in - 1];
   vector_b[p_out - 1] = !vector_b[p_out - 1];
   if (rank == 0) {
      for (i = 1; i < p_in, i++) {
         while (shm_bar_flags[i][p_in -1] != vector_a[p_in - 1]) ;
      }
      shm_bar_flags[0][p_in - 1] = vector_b[p_out - 1];
   } else {
      shm_bar_flags[rank][p_in - 1] = vector_a[p_in - 1];
      while (shm_bar_flags[0][p_out - 1] != vector_b[p_out -1]);
   }
}
```

It should be noted that the pseudo code above is only one example and does not limit the present invention in any way. In other words, the above pseudo code is only one way of coding the following process. If a participant is part of a synchronization among the p_in participants and is not ranked 0 on the node, the synchronization manager 116 first flips the value of bit (p_in-1) of vector_a 402. The synchronization manage 116 of the participant then sets its shared memory flag 406 such that bit (p_in-1) equals bit (p_in-1) of vector_a. In other words a corresponding bit in the shared memory flag 406 reflects the state of a corresponding bit in vector_a 402.

When a participant reaches the barrier that is to leave the barrier as part of a subgroup of the first p_out participants, the synchronization manager 116 of this participant flips the value of bit (p_out-1) of vector_b 404. This distinguishes the current barrier from previous synchronizations. For example, the two local vectors 402, 404 is to make sure that the shared memory flags are set to correct value when declaring the participant's arrival at the barrier; and to make sure what value to expect when checking the leader's shared memory flag for indication to exit the barrier. In order to distinguish consecutive barriers on the same subset of participants, at least two different values are needed. If the previous barrier uses value of 1, this time value of 0 is used. If values of 0 is used previously, this time value of 1 is used.

One advantage of the present invention is that partial barriers are used. With a partial barrier, embodiments of the present invention provide various subgroups of a global group of participants that exit the barrier to perform computations and/or inter-node communications. When one subgroup returns the next subgroup can exit the barrier. This process continues until all subgroups have exited the barrier to perform their respective operations. Once this occurs all of the participants can then exit the barrier. When a participant's rank on the node is 0, which denotes that it is a leader participant, the synchronization manager 116 of this participant flips both the (p_in-1) bit of its vector_a 402 and the (p_out-1) bit of its vector_b 404. It should be noted that the present invention is not limited to designating a 0 ranked participant as the leader. This is only used as one example. The synchronization manager 116 of the leader participant then monitors the shared memory flags 406 of participant 1 through (p_out-1) until bit (p_in-1) of those shared memory flags are all equal to bit (p_in-1) of its vector_a 402. When this occurs, the leader participant sets bit (p_out-1) of its shared memory flag 406 to the value of bit (p_out-1) of its vector_b 404. The p_out-1 participants (i.e., the participants that are the in first subgroup to exit the barrier) check the value of the shared memory flag 406 that belongs to the leader participant (participant 0 in this example). If bit (p_out-1) of participate 0's shared memory flag is equal to the bit (p_out-1) of its own vector_b 404, it can exit the barrier and move on. This process repeats for each subgroup of participants that are to leave the barrier. However, in one embodiment, a subsequent subgroup does not leave the barrier until all of the participants in the previous subgroup have returned to the barrier. Once all subgroups have exited and returned to the barrier, all of the participants exit the barrier.

It should be noted that the ranking associated with participants does not change throughout the entire job. A non-leader participant, in one embodiment, only updates its own shared memory flag 406 to indicate its arrival at the synchronization point and then waits on the leader's shared memory flag to show the value it expects. Participants of different subgroups expect different values of the leader's shared memory flag. For example, assume that there are two subgroups and the barrier sequence requires that the first subgroup exits first, performs some other work, and checks back in the barrier. Then the second subgroup exits and performs some other work and checks back in. Finally all the participants exit. Participants of the second subgroup are not aware there has been another barrier on a different subgroup.

Participants of the first subgroup execute one more barriers. The leader participant then checks all of the participants' shared memory flags. Once the leader participant determines that all of the non-leader participants have arrived at the barrier, the leader participant then sets its own shared memory flag with the value that the first subgroup expects. This indicates to the first subgroup that they can now leave the barrier.

Participants that are members of the second subgroup, but not the first subgroup, block in the barrier. At a later point in time, the participants of the first subgroup return. The participant leader again checks the shared memory flags of the first subgroup participants and determines that they have all returned to the barrier. The leader participant then set its own shared memory flag with the value that the second subgroup expects. This time the second subgroup exits and participants that are members of the first subgroup, but not the second subgroup, block in the barrier. If a subgroup has the entire set of participants, then all participants exit the barrier when the value for that subgroup shows in the leader's shared memory flag. It should be noted that subgroups may overlap. The subgroup specified by the "p_in" parameter (for example) of the barrier call and the subgroup specified by the "p_out" parameter (for example) must have an intersection of at least the leader participant.

Figure 6:
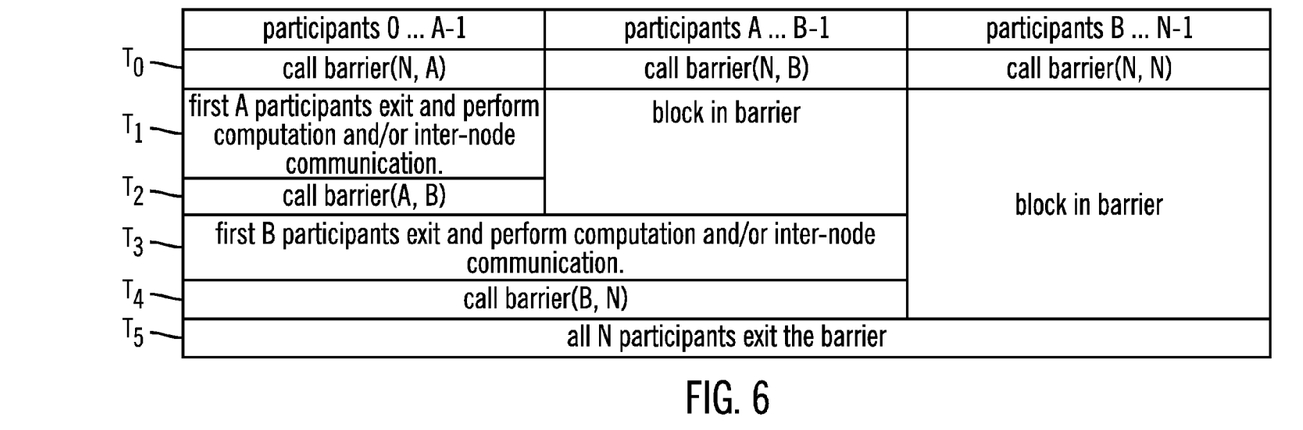
FIG. 6 illustrates one example of a synchronization barrier operation according to one embodiment of the present invention.
Figure 7:
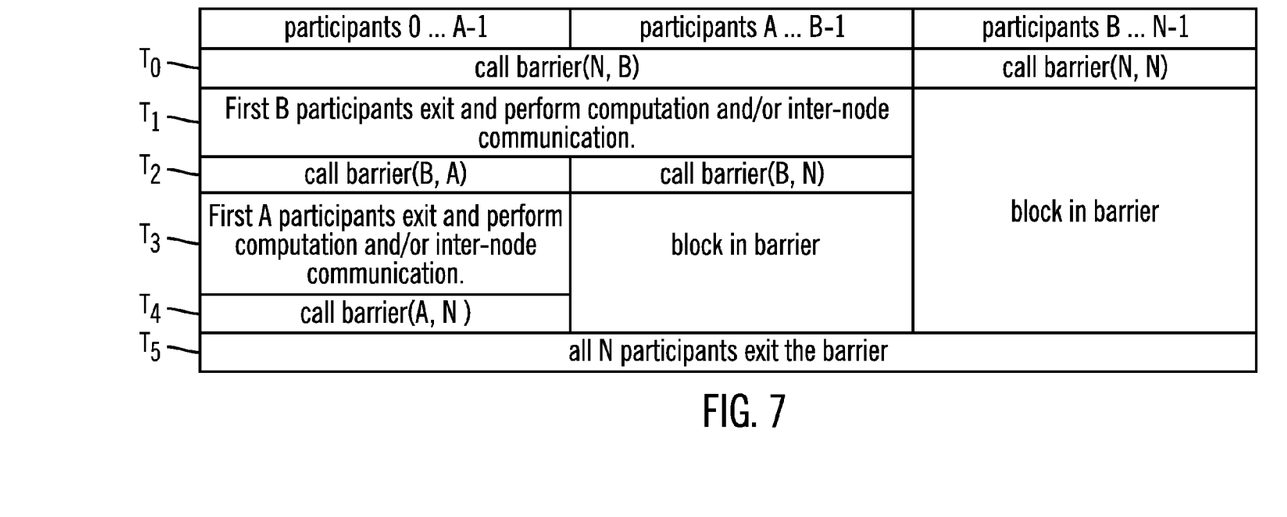
FIG. 7 illustrates another example of a synchronization barrier operation according to one embodiment of the present invention.

FIG. 6 and FIG. 7 show examples of two barrier process sequences for a group of participants. In particular, FIG. 6 shows a group of N participants that arrive at a barrier point and call barrier(N,N). It should be noted that each row is an instance of time where activities in each block of a row are occurring at substantially the same time. FIG. 6 shows three different subgroups of participants, namely participants 0 . . . A-1, participants A . . . B-1, and participants B . . . N-1. Each participant updates its vectors 402, 404 and shared memory flags accordingly, as discussed above. For example, if any of the participants are in the three subgroups are to leave the barrier, they set their vector_b 404 and monitor the leader participants shared memory flag for the corresponding value.

Once each of the participants in the subgroups have arrived at the barrier the first subgroup participants call a partial barrier(N,A), the second subgroup participants call a partial barrier (N, B), and the third subgroup call a partial barrier (N, N) at time T0. The first participant subgroup, at time T1, exits the barrier and performs computations and/or inter-node communications. It should be noted that this is a partial barrier since only a portion of the N participants have left the barrier. The second and third subgroups block in their respective barriers. Each of the first subgroup participants returns and call barrier(A, B), at time T2. When this occurs the shared memory flags of the first subgroup get reset to indicate they have checked back in. Shared memory flags of the second subgroup do not change. The exact value depends on the history of barrier synchronization calls since the beginning of the parallel job. In this example, the second subgroup of participants is larger than the first subgroup of participants.

Once all of the first subgroup participants have returned back, the leader participant updates its shared memory flag accordingly (as discussed above). The first and the second subgroup of participants determine that the leader participant has updated its shared memory flag with a value they that are expecting. In response to detecting this value, the first B participants of the first and the second subgroup, at time T3, exit the barrier and perform computation and/or inter-node communication. The third subgroup of participants still block in the barrier.

Each of the first and the second subgroup participants returns and call barrier(B, N), at time T4. When this occurs the shared memory flags of the first and the second subgroup get reset to indicate they have checked back in. The third subgroup of participants block in the barrier. Once all of the first and the second subgroup participants have returned back, the leader participant updates its shared memory flag accordingly (as discussed above). All of the participants, at time T5, the exit the barrier.

FIG. 7 shows another example of the present invention. In particular, FIG. 7 shows that a group of N participants enter a barrier. Similar to FIG. 6 there are three subgroups of participants, namely participants 0 ... A-1, participants A ... B-1, and participants B ... N-1. Each of these participants updates their vectors 402, 404 as discussed above. For example, each participant updates a first vector (e.g., vector_a 402 when they arrive at the barrier) and its shared memory flag 406. The first and second subgroups, at time T0, call barrier(N, B) and the third subgroup call barrier(N, N). When all of the participants have arrived at the barrier, the leader participant updates its shared memory flag accordingly, as discussed above.

A subset of B participants that are to leave the barrier detect that the leader participant has updated its shared memory flag with a value they are expecting and proceed to leave the barrier, at time T1. The first B participants perform computations and/or inter-node communication. The third subgroup of participants block in the barrier.

The subset of B participants, at time T2, return back to the barrier and the leader participant updates its shared memory flag accordingly. The first subgroup of participants call barrier(B, A) and the second subgroup of participants calls barrier(B, N). The third subgroup of participants blocks in the barrier. In response to the leader updating its shared memory flag, a smaller subset of A participants determines that the value in the shared memory flag is an expected value. The subset of A participants, at time T3, exit the barrier and perform computations and/or inter-node communication. The second and third subsets block in the barrier. The subset of A participants, at time T4, return to the barrier and call barrier(A, N). The second and third subsets block in the barrier. All of the participants, at time T5, then exit the barrier.

Figure 8:
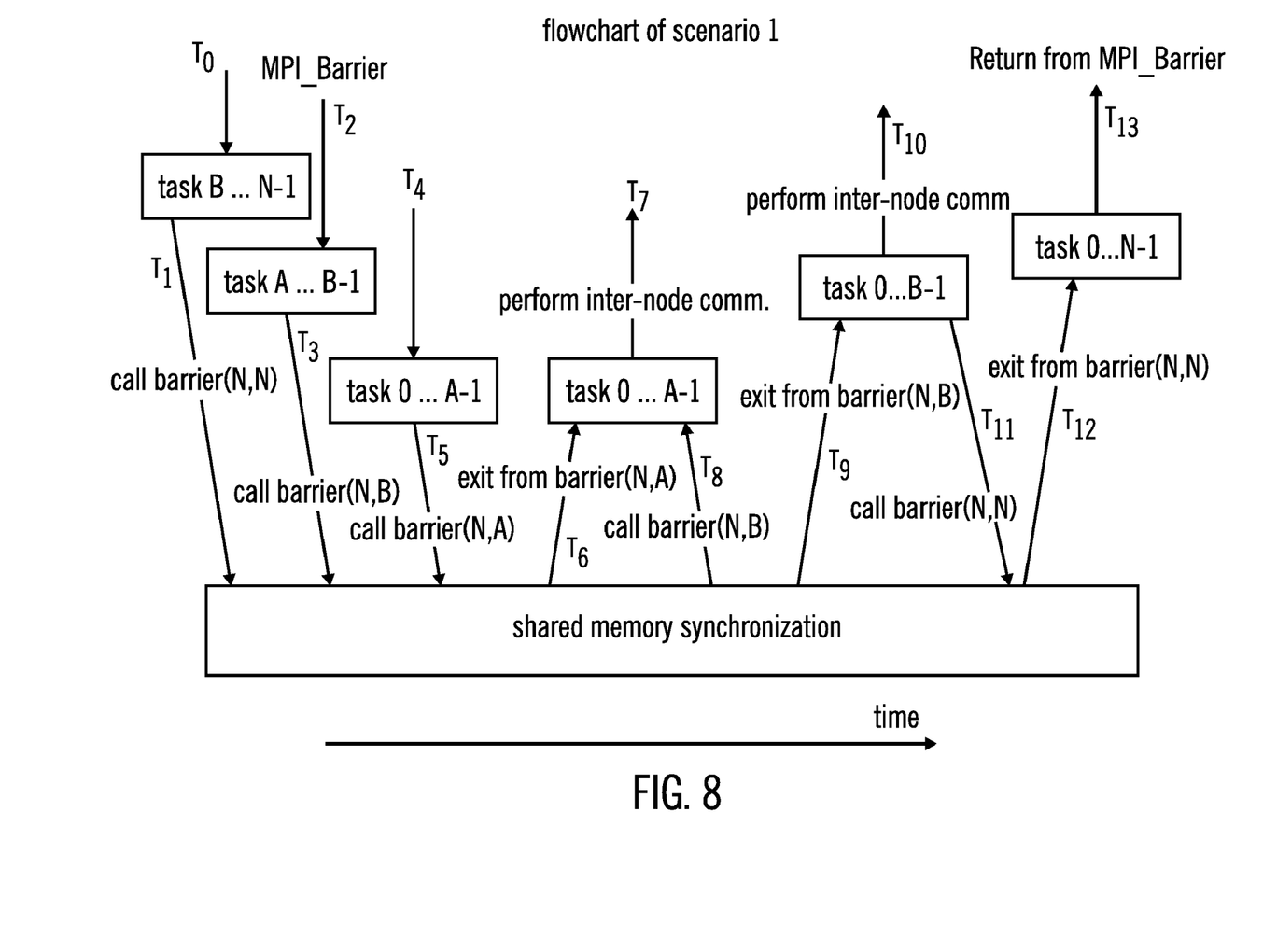
FIG. 8 is an timing diagram for the synchronization barrier operation example given in FIG. 6 according to one embodiment of the present invention.

FIG. 8 is a timing diagram for the example given in FIG. 6. The participants in FIG. 8 are shown as tasks. At time T0, Tasks B to N-1 enter a barrier and at time T1 calls barrier(N, N). Each of the participants set their vectors 402, 404 and shared memory flags 406 as discussed above. At time T2, Tasks A to B-1 enter the barrier and calls barrier(N,B) at time T3. These tasks also set their vectors 402, 404 and shared memory flags 406 as discussed above. Tasks 0 to A-1, at time T4, enter the barrier and at time T5 calls barrier(N,A). As noted above, Tasks 0 to A-1 are the first subgroup that is to exit the barrier. So these tasks also set their second vector, e.g., vector_b 404 to identify the corresponding value in the shared memory flag of the leader participant. These tasks also set their shared memory flags 406 to indicate that they have arrived at the barrier and for determining when to leave the barrier as well.

The leader task for this subgroup, Task 0 in this example, monitors the shared memory flags 406 associated with this subgroup. When all of the shared memory flags 406 associated with this subgroup comprise the same value as the leaders first vector 402 (e.g., the vector that indicates arrival at the barrier), Task 0 updates its second vector to indicate that the participants can exit the barrier and reflects this in its shared memory flag 406. Because the shared memory flag 406 is viewable to all of the participants or at least the participants in this particular subgroup, the subgroup participants detect that Task 0 has indicated in its shared memory flag that they should leave. Therefore, the first subgroup participants exit the barrier(N,A), at time T6, and perform computations and/or inter-node communications at time T7. Each of these subgroup participants return to the barrier and call barrier(N, B) at time T8. This notifies a second subgroup of participants that each of the first subgroup of participants have returned to the barrier.

The second subgroup of participants exit from the barrier (N,B) at time T9. The first and the second subgroup participants then perform computations and/or inter-node communications at time T10. The first and the second subgroup participants, at time T11, then return to the barrier and call barrier(N,N). This notifies all of the participants that the second subgroup has returned. All of the participants (Tasks 0 to N-1), at time T12, exit from the barrier(N,N) and perform a barrier call return at time T13 to close the barrier.

Process For Synchronizing Processes and/or Threads

Figure 9:
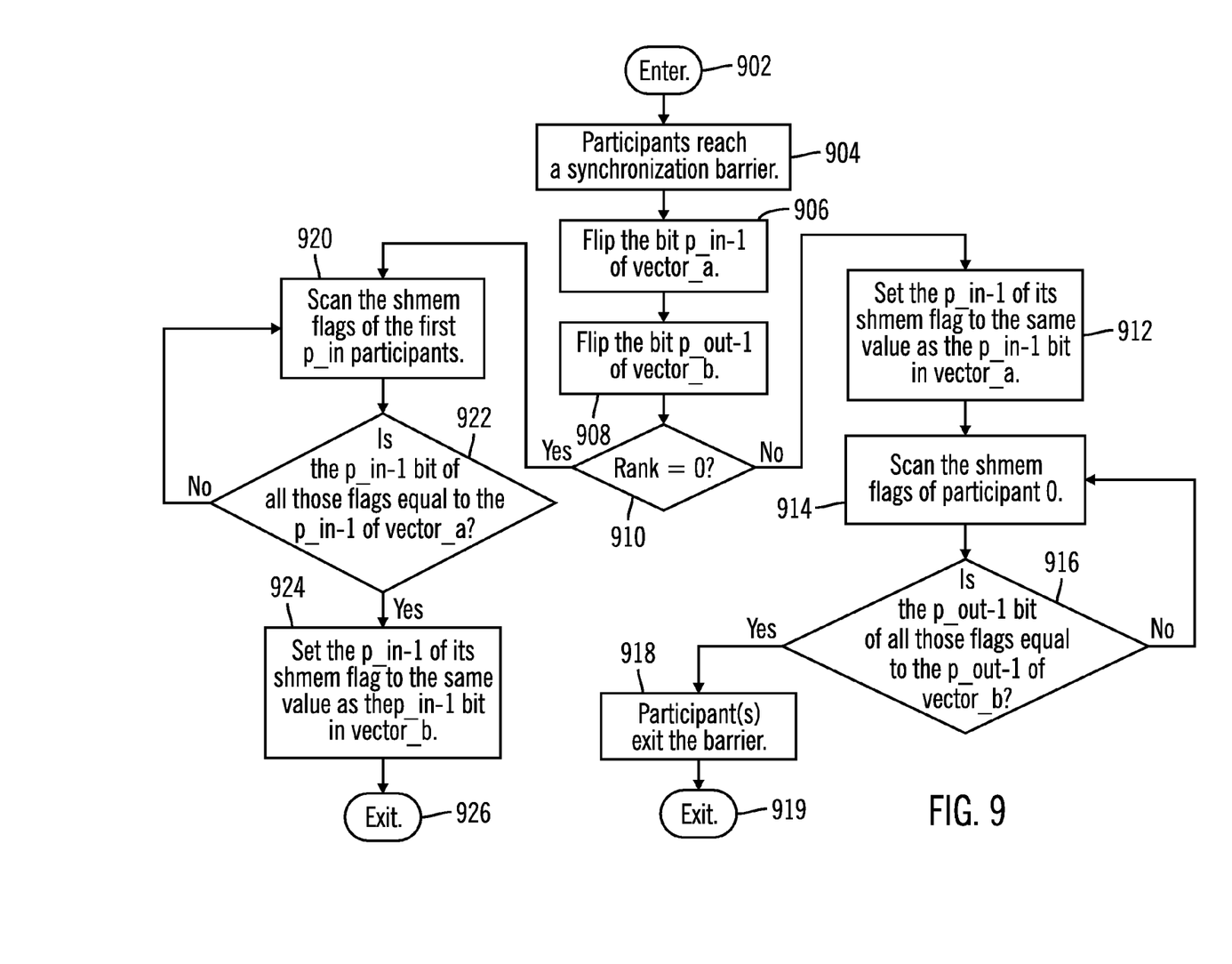
FIG. 9 is an operational flow diagram illustrating a process of synchronizing a set of program participants using one or more barrier operations according to one embodiment of the present invention.

FIG. 9 is an operational diagram illustrating an overall process for synchronizing process and/or threads using partial and/or complete barriers. The operational diagram of FIG. 9 begins at step 902 and flows directly to step 904. Participants, at step 904, reach a barrier synchronization point and call a barrier operation.

Each participant that arrives at the barrier, at step 906, updates a first local vector 402. For example, each participant updates a p_in-1 bit in its first vector 402. This vector 402 indicates that the participant has arrived at the barrier. If the participant is not part of a subgroup that is to exit the barrier next, that participant remains within the barrier and does not update its second vector 404. However, if the participant is part of the subgroup of participants that is to leave the barrier next, the participant, at step 908, updates its second vector 404. For example, the participant updates its p_out-1 bit of the second vector 404. It should be noted that each time a participant updates a local vector 402, 404 it also updates its shared memory flag 406 to reflect that sate of its vectors 402, 404.

A participant, at step 910, determines if its rank indicates that it is a leader of a participant subgroup. For example, the participant determines if its rank is equal to 0. If the result of this determination is negative, the participant, at step 912, updates the p_in-1 bit of its shared memory flag 406 to reflect the value of the p_in-1 bit in its first local vector 402. The participant, at step 414, monitors the shared memory flag 406 of the leader participant. The participant, at step 416, determines if the p_out-1 bit of the leader's shared memory flag 406 is substantially equal to the p_out-1 bit of its second vector 404. If the result of this determination is negative, the control flows back to step 914. If the result of this determination is positive, the participant, at step 918, exits the barrier. The control flow then exits at step 919.

If the result of the determination at step 910 is negative, participant is designated as a leader, and at step 920, monitors the shared memory flags 406 of each of the subgroup participants that are to exit the barrier. The leader participant, at step 922, determines if the p_in-1 bit in all of the shared memory flags 406 associated with the participant subgroup is equal to the p_in-1 bit in its first vector 402. If the result of this determination is negative, the control flows back to step 920. If the result of this determination is positive, the leader participant, at step 924, updates the p_out-1 bit in its shared memory flag 406 to the substantially same value of the p_out-1 bit in its second vector 404. This signals the participant subgroup (including the leader participant) that it can exit the barrier. The control flow then exits at step 926. It should be noted that this process repeats for each subgroup that is to leave the barrier. Once all subgroups have left the barrier and have returned back from performing computations and/or inter-node communications, all of participants can then leave the barrier.

Processing Node

Figure 10:
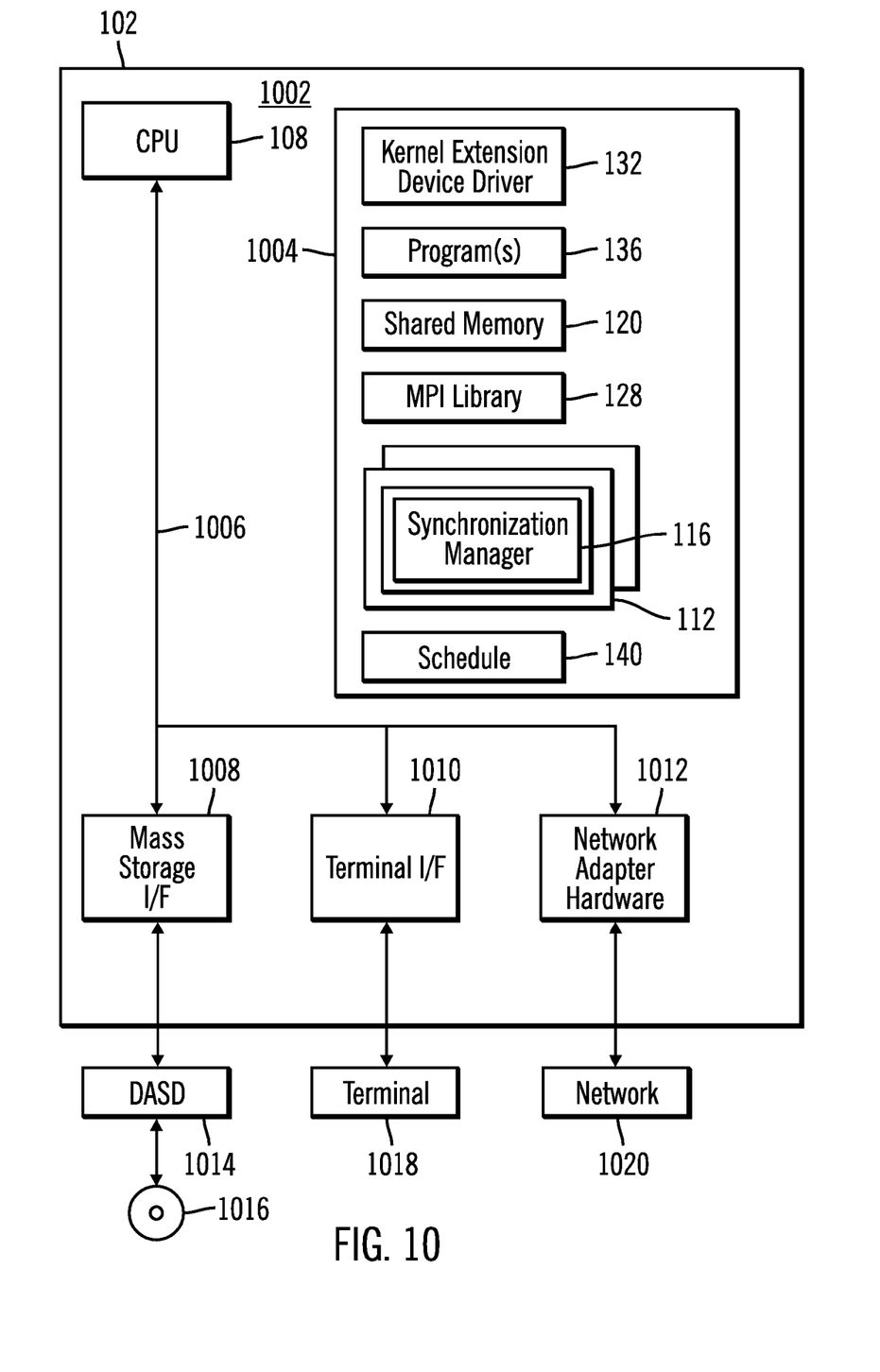
FIG. 10 is a detailed view of an information processing node of FIG. 1 according to one embodiment of the present invention

FIG. 10 is a block diagram illustrating a more detailed view of a processing node 102 of FIG. 1. The processing node 102 is based upon a suitably configured processing system adapted to implement the at least one embodiment of the present invention. Any suitably configured processing system is similarly able to be used as the information processing system 102 by embodiments of the present invention, for example, a personal computer, workstation, or the like. The processing node 102 includes a computer 1002. The computer 1002 includes one or more processors 108, a main memory 1004. A system input/output bus 1006 couples a mass storage interface 1008, a terminal interface 1010, and network hardware 1012. The mass storage interface 1008 is used to connect mass storage devices such as data storage device 1014 to the processing node 102. One specific type of data storage device is a computer readable medium such as a CD drive or DVD drive, which may be used to store data to and read data from a CD 1016 (or DVD). Another type of data storage device is a data storage device configured to support, for example, NTFS type file system operations.

The main memory 1004, in one embodiment, includes the kernel extension/device driver 132, program code 136, MPI library 128, a scheduler 140, 142, and process/threads 112 associated with the program code 136. Each of the processes/threads 112, in one embodiment, comprises the synchronization manager 116. It should be noted that one or more processes/threads 112 can also reside within the processor(s) 108. The main memory 1004 can also include one or more areas of shared memory 120 that is used by the processes/threads 112. In another embodiment, a separate memory component (not shown) can be used as the shared memory 120. Each of these components has been discussed above in greater detail.

Various embodiments of the present invention further incorporate interfaces that each includes separate, fully programmed microprocessors that are used to off-load processing from the CPU 108. The terminal interface 1008 is used to directly connect the processing node 102 with one or more terminals 1018 to the processing node 102 for providing a user interface to the computer 1002. These terminals 1018, which are able to be non-intelligent or fully programmable workstations, are used to allow system administrators and users to communicate with the processing node 102. A terminal 1018 is also able to consist of user interface and peripheral devices that are connected to the computer 1002.

An operating system image (not shown) included in the main memory 1004 is a suitable multitasking operating system such as the Linux, UNIX, Windows XP, and Windows Server operating system. Embodiments of the present invention are able to use any other suitable operating system. Some embodiments of the present invention utilize architectures, such as an object oriented framework mechanism, that allows instructions of the components of operating system (not shown) to be executed on any processor located within the processing node 102. The network adapter hardware 1012 is used to provide an interface to a network 1020 such as a wireless network, WLAN, LAN, or the like. Various embodiments of the present invention are able to be adapted to work with any data communications connections including present day analog and/or digital techniques or via a future networking mechanism.

Although the various embodiments of the present invention are described in the context of a fully functional computer system, those skilled in the art will appreciate that embodiments are capable of being distributed as a program product via a CD/DVD, e.g. CD 1016, or other form of recordable media, or via any type of electronic transmission mechanism.

Non-Limiting Examples

The present invention can be realized in hardware, software, or a combination of hardware and software. A system according to at least one embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention

What is claimed is:

1. A method with a parallel processing system for performing synchronization operations between participants of a program, each participant including at least one of a set of processes and a set of threads, and including a first local vector and a second local vector that are local to the respective participant, the method comprising:
   updating, by each participant in a first subset of participants of a program, a portion of a first local vector that is local to, and that indicates an arrival status at a synchronization barrier by, the respective each participant of the first subset, wherein the first local vector is within a private address space of the respective each participant;
   updating, by each participant in a second subset of participants of the program, a portion of a second local vector that is local to, and that indicates an arrival status at the synchronization barrier by, the respective each participant of the second subset, wherein the second local vector is within the private address space of the respective each participant;
   determining, by the participants in the second subset of participants, that all of the participants in the first subset of participants have reached the synchronization barrier; and
   exiting the synchronization barrier, by the participants in the second subset of participants, in response to the determining that all of the participants in the first subset of participants have reached the synchronization barrier, wherein the participants in the first subset of participants remain at the synchronization barrier after the participants in the second subset of participants exit the synchronization barrier until the participants in the second subset of participants return to the synchronization barrier.

2. The method of claim 1, further comprising:
   notifying, by each participant of the first subset of participants its arrival at the synchronization barrier;
   determining, in response to the notifying by each participant of the first subset of participants, that all of the participants in the first subset of participants have arrived at the synchronization barrier; and
   notifying at least the second subset of participants that all participants in the first subset of participants have reached the synchronization barrier.

3. The method of claim 1, further comprising:
   monitoring a participant blocking status, by participants in the first subset, but not the second subset, in the synchronization barrier.

4. The method of claim 1, wherein the exiting by each of the second subset participants further comprises:
   monitoring a value in a portion of a shared memory flag that is shared by all participants, wherein the portion corresponds to the respective each participant of the second subset of participants;
   determining that the value in the portion of the shared memory flag that is shared by all participants is equal to a value in the portion of the second vector corresponding to the respective each participant of the second subset of participants; and
   exiting, in response to the determining, the synchronization barrier.

5. The method of claim 1, wherein the updating of the portion of the second local vector by each participant in the second subset, further comprises:
   changing the portion of the second local vector that corresponds to the respective each participant in the second subset, to one of two predefined values where the other of the two predefined values represents an exiting status of the respective each participant in the second subset.

6. The method of claim 1, wherein the synchronization barrier is carried out among participants that are one of:
   all on a same node; and
   participants that are on multiple nodes comprising at least one node with multiple participants.

7. The method of claim 1, wherein the synchronization barrier is one of a partial barrier and a complete barrier.

8. The method of claim 1, wherein the synchronization barrier defines for each of the first subset of participants and the second subset of participants at least two values, wherein a first value indicates how many participants a synchronization is to be performed among, and wherein a second value indicates how many participants are to leave the synchronization barrier after a particular synchronization.

9. The method of claim 1, wherein the updating of the portion of the first local vector by each participant in a first subset, further comprises:
   changing the portion of the first local vector that corresponds to the respective each participant in the first subset, to one of two predefined values where the other of the two predefined values represents an exiting status of the respective each participant in the first subset; and
   changing, by each participant in the first subset of participants, a portion of a shared memory flag corresponding to the respective each participant of the first subset of participants to one of two predefined values in the portion of the first local vector that corresponds to arrival of the respective each participant of the first subset at the synchronization barrier.

10. The method of claim 9, further comprising:
    notifying that all participants in the first subset of participants have reached the synchronization barrier, wherein the notifying further comprises:
    checking, for each participant in the first subset of participants, the portion of the shared memory flag corresponding to the respective each participant of the first subset of participants;
    determining that the value in the portion of the shared memory flag for the respective each participant in the first subset of participants is a predefined value that corresponds to the arrival of the respective each participant of the first subset of participants in the synchronization barrier; and
    changing, in response to determining that all participants in the first subset of participants have the predefined value in the portion of the shared memory flag thereby indicating arrival in the synchronization barrier, a portion of a shared memory flag that is shared by all of the participants to a value indicating exit status and thereby notifying the second subset of participants that all participants in the first subset of participants have arrived at the synchronization barrier.

11. An information processing node in a parallel processing system for performing synchronization operations between participants of a program, each participant including at least one of a set of processes and a set of threads, and including a first local vector and a second local vector that are local to the respective participant, the information processing node comprising:
- a memory;
- a processor; and
- a plurality of participants comprising at least first subset of participants and at least a second subset of participants associated with a program, wherein each participant comprises at least one of a set of processes and a set of threads, wherein:
  - each participant in the first subset of participants is adapted to update a portion of a first local vector that is local to the respective each participant of the first subset, wherein the first local vector is within a private address space of the respective each participant;
  - each participant in the second subset of participants is adapted to update a portion of a second local vector that is local to the respective each participant of the second subset, wherein the second local vector is within the private address space of the respective each participant;
  - wherein the participants in the second subset of participants are further adapted to determine that all of the participants in the first subset of participants have reached the synchronization barrier;
  - wherein the participants in the second subset of participants are further adapted to exit the synchronization barrier, in response to having determined that all of the participants in the first subset of participants have reached the synchronization barrier,
  - wherein the participants in the first subset of participants remain at the synchronization barrier after the participants in the second subset of participants exit the synchronization barrier until the participants in the second subset of participants return to the synchronization barrier.

12. The information processing node of 11, wherein each of the second subset participants are further adapted to exit by:
- monitoring a value in a portion of a shared memory flag that is shared by all participants, wherein the portion corresponds to the respective each participant of the second subset of participants;
- determining that the value in the portion of the shared memory flag that is shared by all of the participants corresponding is equal to a value in the portion of the second vector corresponding to the respective each participant of the second subset of participants; and
- exiting, in response to the determining, the synchronization barrier.

13. The information processing node of claim 11, wherein:
- each participant of the first subset of participants is further adapted to notify its arrival at a synchronization barrier by:
  - changing, by each participant in the first subset of participants, a portion of a shared memory flag corresponding to the respective each participant of the first subset of participants to one of two predefined values in the portion of the first local vector that corresponds to arrival of the respective each participant of the first subset at the synchronization barrier;
- wherein at least one participant in the first subset of participants and the second subset of participants is further adapted to determine that all of the participants in the first subset of participants have arrived at the synchronization barrier in response to the notifying by each participant of the first subset of participants;
- wherein at least one participant in the first subset of participants and the second subset of participants is further adapted to notify at least the second subset of participants that all participants in the first subset of participants have reached a synchronization barrier; and
- wherein the participants in the first subset, but not the second subset, are further adapted to monitor a participant blocking status in the synchronization barrier.

14. The information processing node of claim 13, wherein the at least one participant in the first subset of participants and the second subset of participants is further adapted to notify that all participants in the first subset of participants have reached a synchronization barrier by:
- checking, for each participant in the first subset of participants, the portion of the shared memory flag corresponding to the respective each participant of the first subset of participants;
- determining that the value in the portion of the shared memory flag for the respective each participant in the first subset of participants is a predefined value that corresponds to the arrival of the respective each participant of the first subset of participants in the synchronization barrier; and
- changing, in response to determining that all participants in the first subset of participants have the predefined value in the portion of the shared memory flag thereby indicating arrival in the synchronization barrier, a portion of a shared memory flag associated with the at least one participant and shared by all participants to a value indicating exit status and thereby notifying the second subset of participants that all participants in the first subset of participants have arrived at the synchronization barrier.

15. A computer program storage product for performing synchronization operations between participants of a program, each participant including at least one of a set of processes and a set of threads, and including a first local vector and a second local vector that are local to the respective participant, the computer program storage product comprising instructions for:
- updating, by each participant in a first subset of participants of a program, a portion of a first local vector that is local to the respective each participant of the first subset, wherein the first local vector is within a private address space of the respective each participant;
- updating, by each participant in a second subset of participants of the program, a portion of a second local vector that is local to the respective each participant of the second subset, wherein the second local vector is within the private address space of the respective each participant;
- determining, by the participants in the second subset of participants, that all of the participants in the first subset of participants have reached the synchronization barrier; and
- exiting the synchronization barrier, by the participants in the second subset of participants, in response to the determining that all of the participants in the first subset of participants have reached the synchronization barrier, wherein the participants in the first subset of participants remain at the synchronization barrier after the participants in the second subset of participants exit the synchronization barrier until the participants in the second subset of participants return to the synchronization barrier.

16. The computer program product of claim 15, wherein the instructions for exiting by each of the second subset participants further comprises instructions for:
- monitoring a value in a portion of a shared memory flag associated with a leader participant, wherein the leader participant is a leader of at least one of the first subset of participants and the second subset of participants;
- determining that the value in the portion of the shared memory flag associated with the leader participant is equal to a value in the portion of the second vector corresponding to the respective each participant of the second subset of participants, wherein the value is a predefined value indicating an exiting status; and
- exiting, in response to the determining, the synchronization barrier.

17. The computer program product of claim 15, wherein the instructions for updating the portion of the second local vector by each participant in the second subset, further comprises instructions for:
- changing the portion of the second local vector that corresponds to the respective each participant in the second subset, to one of two predefined values where the other of the two predefined values represents an exiting status of the respective each participant in the second subset.

18. The computer program storage product of claim 15, further comprising instructions for:
- notifying, by each participant of the first subset of participants its arrival at a synchronization barrier;
- determining, in response to the notifying by each participant of the first subset of participants, that all of the participants in the first subset of participants have arrived at the synchronization barrier;
- notifying, by a leader participant associated with at least one of the first subset of participants and the second subset of participants, at least the second subset of participants that all participants in the first subset of participants have reached the synchronization barrier; and
- monitoring a participant blocking status, by participants in the first subset, but not the second subset, in the synchronization barrier.

19. The computer program product of claim 15, wherein the instructions for updating of the portion of the first local vector by each participant in a first subset, further comprises instructions for:
- changing, by each participant in the first subset of participants, the portion of the first local vector that corresponds to the respective each participant in the first subset, to one of two predefined values where the other of the two predefined values represents an exiting status of the respective each participant in the first subset; and
- changing, by each participant in the first subset of participants, a portion of a shared memory flag corresponding to the respective each participant of the first subset of participants to one of two predefined values in the portion of the first local vector that corresponds to arrival of the respective each participant of the first subset at the synchronization barrier.

20. The computer program product of claim 19, further comprising instructions for:
- notifying, by a leader participant associated with at least one of the first subset of participants and the second subset of participants, that all participants in the first subset of participants have reached the synchronization barrier, wherein the notifying further comprises instructions for:
  - checking, by the leader participant for each participant in the first subset of participants, the portion of the shared memory flag corresponding to the respective each participant of the first subset of participants;
  - determining, by the leader participant, that the value in the portion of the shared memory flag for the respective each participant in the first subset of participants is a predefined value that corresponds to the arrival of the respective each participant of the first subset of participants in the synchronization barrier; and
  - changing, by the leader participant in response to determining that all participants in the first subset of participants have the predefined value in the portion of the shared memory flag thereby indicating arrival in the synchronization barrier, a portion of a shared memory flag associated with the leader participant to a value indicating exit status and thereby notifying the second subset of participants that all participants in the first subset of participants have arrived at the synchronization barrier.

* * * * *